United States Patent [19]

Huss

[11] 4,418,357

[45] Nov. 29, 1983

[54] TONER TRANSPORT SYSTEM FOR ELECTROGRAPHIC IMAGING

[75] Inventor: Charles P. Huss, Oak Park Heights, Minn.

[73] Assignee: Minnesota Mining and Manufacturing Company, St. Paul, Minn.

[21] Appl. No.: 267,790

[22] Filed: May 28, 1981

[51] Int. Cl.[3] .............................................. G01D 15/06

[52] U.S. Cl. .................................. 346/153.1; 118/657

[58] Field of Search ..................... 346/153.1, 160, 74.2; 118/652, 657, 658; 355/3 DD, 15; 427/261; 430/122, 125

[56] References Cited

U.S. PATENT DOCUMENTS

| | | | |
|---|---|---|---|
| 3,914,771 | 10/1975 | Lunde et al. | 346/74.2 |
| 3,946,402 | 3/1976 | Lunde | 346/153.1 |
| 4,154,522 | 5/1979 | Ikesue | 355/15 |
| 4,266,868 | 5/1981 | Bresina et al. | 355/3 DD |

FOREIGN PATENT DOCUMENTS

| | | | |
|---|---|---|---|
| 54-51847 | 4/1979 | Japan | 346/153.1 |

*Primary Examiner*—Thomas H. Tarcza

*Attorney, Agent, or Firm*—Donald M. Sell; James A. Smith; Robert L. Marben

[57] ABSTRACT

A toner powder transport system provides continual magnetic controlled movement of magnetically attractable toner powder from a toner reservoir to an imaging styli array plus return of unused toner powder to the toner reservoir. A nonrotatable cylindrical member carries the imaging styli array. A rotating magnetic means within the nonrotatable cylinder causes toner brought to the nonrotatable cylinder to move around the nonrotatable cylinder and over the styli array. A magnetic transport means is disposed between the toner reservoir and the nonrotatable cylinder for bringing toner powder from the toner reservoir for magnetic transfer to the nonrotatable cylinder and magnetically removes unused toner powder from the nonrotatable cylinder for return by the magnetic transport means to the toner reservoir. A protuberance at the surface of the nonrotatable cylindrical member serves to reduce the magnetic field acting on the toner at the point of its transfer to the magnetic transport means for return to the toner reservoir.

4 Claims, 3 Drawing Figures

TONER TRANSPORT SYSTEM FOR ELECTROGRAPHIC IMAGING

BACKGROUND OF THE INVENTION

The present invention relates in general to electrographic formation of toner powder images on a recording medium and more specifically, to a toner powder transport system for providing controlled movement of magnetically attractable toner powder from a toner powder reservoir to a recording area at which an imaging styli array is positioned and providing for the removal of unused toner powder from the recording area plus its return to the toner powder reservoir.

As indicated in U.S. Pat. No. 3,946,402 to Lunde, there are prior art electrographic recording systems for forming toner powder images on a recording medium which provide for the transporting of toner powder to a recording region in some manner. Various types of toner transport systems have been devised. U.S. Pat. No. 3,121,375 to Fotland et al., U.S. Pat. No. 2,932,548 to Nau et al discloses arrangements wherein toner powder is provided to the recording region through a portion that serves as a recording electrode. This approach for supplying toner powder to the recording region is not practical where the recording electrodes are spaced very close to each other.

Another arrangement for delivering toner powder to a recording region involves use of a separate developing element to which toner is first applied. The developing element may be in the form of a porous endless belt on which the toner is carried into the recording region, as disclosed in U.S. Pat. No. 3,355,743 to Capps, or may in the case of magnetically attractable toner powder, be in the form of a cylinder that encloses a magnet assembly that presents alternate magnetic poles adjacent the cylinder wherein rotation of the magnet assembly or cylinder brings the toner powder to the recording region as taught in U.S. Pat. No. 3,816,840 to Kotz.

A primary deficiency with the above types of prior art toner applicators is that they do not provide adequate control of the amount and movement of toner powder to the recording region and removal of unused toner from the recording region when large numbers of narrowly spaced apart imaging styli are employed in an imaging styli array. It is difficult to precisely meter thin, uniform amounts of toner powder into the recording region without experiencing occasional plugging of metering orifices or doctor blade gaps because of toner powder agglomeration. If too much toner powder is transported into the recording region, the toner powder images formed tend to bloom out and will not have sharply defined edges. When plastically deformable toner powders are used, an excessive amount of toner powder in the recording region may increase pressure applied on the toner powder by the recording electrode and the recording medium to the point that there is a gradual toner build-up on the recording electrode. If inadequate toner is transported onto the recording region, the formed toner images suffer a loss of density and become light or disappear altogether.

U.S. Pat. No. 3,946,402 to Lunde discloses a toner applicator arrangement designed to overcome the deficiencies of the above described systems which accurately meters an optimum level of toner from a toner supply onto a recording member which moves to present the toner powder to a recording region in order that high quality, high resolution toner images can be formed. Nonrecorded or unused toner powder is magnetically removed from the recording member and is then physically removed by a remover after allowing the removed toner to fall by gravity back to the toner supply. With this arrangement an undesirable amount of toner powder is projected into the air and also excess toner powder in the removal region becomes air entrained. In addition, since the recording member is pretoned by this arrangement, considerable background toner powder remains on the recording member, particularly on rough recording members such as rough paper.

SUMMARY OF THE INVENTION

The invention presented herein avoids the problems and deficiencies of the prior art toner powder transport systems by providing a toner powder transport system for the controlled movement of magnetically attractable toner powder from a toner reservoir to an imaging styli array plus return of unused toner powder to the toner reservoir. The system includes a nonrotatable cylindrical member of nonmagnetic material which carries an imaging styli array with a protuberance provided at the surface of the cylindrical member; a rotatable magnetic means disposed for rotation about its axis in one direction within the nonrotatable cylindrical member, the rotatable magnetic means presenting alternate magnetic poles adjacent the inner surface of said nonrotatable cylindrical member; the toner reservoir having an opening through which toner powder can be removed from said reservoir; a magnetic transport means disposed between the toner reservoir and the nonrotatable cylindrical member with a first portion of the magnetic transport means positioned near the protuberance and a second portion of the magnetic transport means positioned near the nonrotatable cylindrical member at an area removed from the protuberance. The magnetic transport means presents a magnetic field at the protuberance that is of a strength sufficient to magnetically move toner powder from the protuberance to the magnetic transport means. The rotatable magnetic means presents a magnetic field at the second portion that is of a strength sufficient to magnetically move toner powder from the protuberance to the magnetic transport means. The rotatable magnetic means presents a magnetic field at the second portion that is of a strength sufficient to magnetically move toner powder from the magnetic transport means to the nonrotatable cylindrical member. The magnetic transport means provides a surface disposed for movement adjacent the opening in the toner reservoir whereby toner powder provided in the toner reservoir flows from the toner reservoir and is carried to the second portion of the magnetic transport means where it is magnetically transferred to the nonrotatable cylindrical member. Rotation of the rotatable magnetic means causes the toner powder that is transferred to the nonrotatable cylindrical member to be magnetically transported over the surface of the nonrotatable cylindrical member to the imaging styli array and thence to the protuberance where it is magnetically transferred to the magnetic transport means from said nonrotatable cylindrical member at the first portion of the magnetic transport means and returned by said magnetic transport means to the toner reservoir.

The magnetic transport means functions to maintain magnetic control over the toner powder removed from the toner reservoir until control is relinquished to the magnet field presented by rotatable magnetic means disposed within the nonrotatable cylindrical member. The magnetic transport means again assumes magnetic control of the toner that is brought to the protuberance on the nonrotatable cylindrical member due to rotation of the rotatable magnetic means to carry such toner back to the toner reservoir.

The magnetic transport means can be provided in a number of ways. In one embodiment, the magnetic transport means includes a rotatable cylindrical member disposed for rotation about its axis in a direction opposite to the direction of rotation of the rotatable magnetic means within the nonrotatable cylindrical member. The outer surface of the rotatable cylindrical member provides the surface disposed for movement adjacent the opening in the toner reservoir. A magnetic means mounted within the rotatable cylindrical member provides the necessary magnetic field mentioned earlier with respect to the first portion of the magnetic transport means.

In another embodiment, the magnetic transport means, as for the first embodiment, includes a first rotatable cylindrical member disposed for rotation about its axis in a direction opposite to the direction of rotation of the rotatable magnetic means within the nonrotatable cylindrical member. The outer surface of the first rotatable cylindrical member provides the surface disposed for movement adjacent the opening in the toner reservoir from which toner is removed and also provides the first portion of the magnetic transport means that is presented near the protuberance on the nonrotatable member. A first magnetic means is mounted within the first rotatable cylindrical member which provides the magnetic field that has been indicated to be presented by the magnetic transport means at the protuberance. A second rotatable cylindrical member is also included which is positioned near the first rotatable cylindrical member and is disposed for rotation about its axis opposite to the direction of rotation of the first rotatable cylindrical member. The outer surface of the second rotatable cylindrical member provides the second portion of the magnetic transport means that is presented near the nonrotatable cylindrical member at a point removed from the protuberance. A second magnetic means is positioned within the second rotatable cylindrical member which provides a magnetic field adjacent the first rotatable cylindrical member that is of a strength sufficient to move toner powder carried on the first rotatable cylindrical member to the second rotatable cylindrical member.

In a third embodiment, the magnetic transport means includes a first and second rotatable cylindrical member as in the second embodiment. The two cylindrical members are spaced apart to permit use of a transport coupling means between the two members. A magnetic means is disposed within each of the rotatable cylindrical members. The magnetic means for the first rotatable cylindrical member provides the magnetic field required to be presented by the magnetic transport means at the protuberance. The transport coupling means includes a first moveable surface portion disposed for movement adjacent the first rotatable cylindrical member and a second moveable surface portion disposed for movement adjacent the second rotatable cylindrical member. The transport coupling means provides a magnetic field at the first moveable surface portion which is of a strength sufficient to transfer toner powder carried on the first rotatable cylindrical member to the transport coupling means. The magnetic field provided by the magnetic means within the second rotatable cylindrical member presents a magnetic field at said second moveable portion that is of a strength sufficient to transfer toner powder carried on the transport coupling means to the second rotatable cylindrical member.

The use of a transport coupling means as described for the third embodiment allows space to be provided adjacent the nonrotatable cylindrical member and between the first and second rotatable cylindrical members for mounting components or circuitry for apparatus utilizing the toner powder transport system of the present invention.

BRIEF DESCRIPTION OF THE DRAWINGS

For a better understanding of the invention, reference is had to the following detailed description of the invention to be read in conjunction with the accompanying drawings in which.

DETAILED DESCRIPTION

Figure 1:
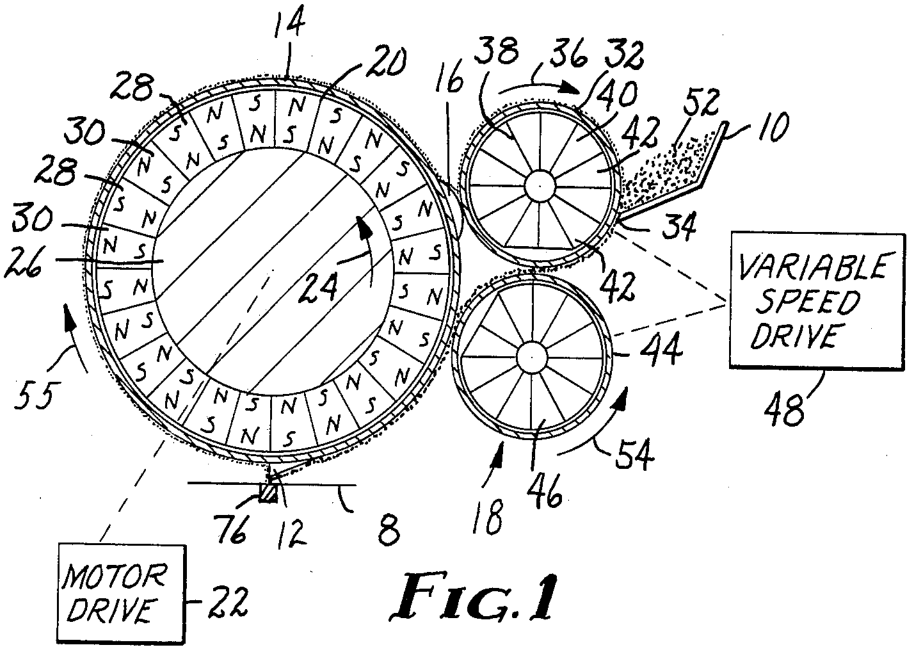
FIG. 1 is a schematic cross-sectional view of one embodiment of the invention.

Referring to FIG. 1 of the drawing, a preferred embodiment of the invention is illustrated which provides a toner powder transport system for the controlled movement of magnetically attractable toner powder from a toner reservoir 10 to an imaging styli array 12 plus return of unused toner powder to the toner reservoir. The toner powder transport system of FIG. 1 embodying the invention includes a nonrotatable cylindrical member 14, a protuberance 16 at the surface of the cylindrical member 14, a rotatable magnetic means 20, and a magnetic transport means 18 disposed between the toner reservoir 10 and the nonrotatable cylindrical member 14. The rotatable magnetic means 20 is disposed for rotation about its axis in one direction within the nonrotatable cylindrical member 14. A motor drive 22 is used to drive the rotatable magnetic means 20 in one direction as indicated by the arrow 24, which shows counterclockwise rotation. The rotatable magnetic means 20 includes an iron core member 26 at the periphery of which are carried a plurality of permanent magnets 28 ans 30 which are alternately positioned about the iron core 26. The magnets 28 are polarized to have a different magnetic pole on the outer surface than on the inner surface; for example, the north pole, indicated at N, is at the outer surface, while the south pole, indicated at S, is on the inner face of the magnet 28. The magnets 30 are polarized so the north pole is on the inner face and the south pole at the outer face. In this manner, the magnets 28 and 30 provide alternate north and south magnetic poles about the periphery of the rotatable magnetic means 20. Only a slight gap is presented between the outer surface of the magnets 28 and 30 and the inner surface of the non-rotatable cylindrical member 14. The magnets 28 and 30 extend parallel to the axis of the core member 26 with each magnet presenting a magnetic field that is substantially uniform along its length. For a 9 cm diameter cylindrical member 14, a rotatable magnetic means 20 as described, has been constructed using about 40 permanent magnet members 28 and 30. The multiple pole, segmented magnetic assembly 20 provided by the core member 26 and the magnets 28 and 30 is operated at a high speed, for example 3600 rpm. A nonrotatable magnetic cylindrical member 14 electrically nonconductive, formed from nonmagnetic material is preferred to avoid the generation of heat due to eddy currents that would otherwise result from the rapid rotation of the magnets.

The magnetic transport means 18 includes a first rotatable cylindrical member 32 disposed for rotation about its axis in a direction opposite to the direction of rotation of the rotatable magnetic means 20. In the case of FIG. 1, rotation is clockwise for member 32 as indicated by arrow 36. The rotatable cylindrical member 32 is disposed so its outer surface at one point is adjacent to and moveable past the opening 34 at the toner reservoir 10 and at another point moves close to the protuberance 16. A magnetic means 38 is mounted within the rotatable cylindrical member 32. The magnetic means 38 is constructed in a manner similar to the magnetic means 20 in that a plurality of permanent magnets 40 and 42 are alternately positioned about a central iron core member. Magnets presenting a magnetic field of about 200 to 300 gauss at the member 32 have been found to be suitable. The magnets 40 and 42 provide alternate north and south magnetic poles at the periphery of the magnetic means 38. Only a slight gap is presented between the outer surface of the magnets 40 and 42 and the inner surface of the rotatable cylindrical member 32 except for a portion of the magnetic means 38 where a portion of the magnets have been cut away so that a lesser magnetic field is presented at the outer surface of the cylindrical member 32 opposite such cut away portion. The magnetic transport means 18 includes a second rotatable cylindrical member 44 within which a nonrotatable magnetic means 46, similar in structure to the magnetic means 38, is positioned. The cylindrical member 44 is arranged to be rotated opposite to the direction of member 32. Member 44, in the case of FIG. 1, is rotated counterclockwise as indicated by the arrow 54. The cylindrical member 44 provides a surface portion that moves close to the rotatable cylindrical member 14. The cylindrical member 44 is further positioned so it is a short distance about 0.75 to 1.5 mm, from the cylindrical member 32. As in the case of the magnetic means 38, the magnetic means 46 has a portion of the magnets cut away so as to present a lesser magnetic field at the outer surface of the cylindrical member 44 opposite such cut away portion. The magnetic means 38 within the cylindrical member 32 is positioned so the portion that gives rise to a lesser magnetic field at the surface of the cylindrical member 32 is opposite the cylindrical member 44. The magnetic means 46 is positioned so that the portion presenting a lesser magnetic field at the surface of the cylindrical member 44 is positioned so such lesser magnetic field is opposite the nonrotatable cylindrical member 14. For operation of the toner powder transport system of FIG. 1, the rotatable cylindrical members 32 and 44 are shown being simultaneously driven from a variable speed drive 48 which serves to rotate the cylindrical members 32 and 44 at a slow speed relative to the speed of rotation of the magnetic means 20. In practice, the cylindrical members 32 and 44 are rotated at a rate of about 1 to 10 rpm depending on the amount of toner it is desired to have presented to the styli array 12.

With magnetically attractable toner powder 52 present in the toner reservoir 10, clockwise rotation of the cylindrical member 32 causes toner powder to be carried from the reservoir 10 via the opening 34 to the area adjacent the rotating cylindrical member 44. While not shown, an adjustable doctor blade is used to adjust the flow of toner from the opening 34. Use of a doctor blade for such purpose is well known in the art. The magnetic field provided by the magnetic means 38 is reduced in the vicinity of the cylindrical member 44 so that the magnetic field provided by magnetic means 46 is great enough to cause the toner powder to be magnetically transferred from the cylindrical member 32. Counterclockwise rotation of the cylindrical member 44 causes the toner powder to be carried to an area adjacent the nonrotatable cylindrical member 14. At this portion of the cylindrical member 44, the magnetic field presented by the magnetic means 46 at the surface of member 44 is reduced so the magnetic field presented by the rotatable magnetic means 20 is great enough to cause toner powder to be magnetically transferred from the cylindrical member 44 to the cylindrical member 14. As has been indicated, the magnetic means 20 is rotated very rapidly in a counterclockwise direction. The counterclockwise movement of the magnetic means 20 causes the toner powder particles to tumble causing the toner powder to move in a clockwise direction over the surface of the cylindrical member 14 as indicated by the arrow 55. The toner powder is carried over the styli array 12 to the protuberance 16 at the surface of the cylindrical member 14. The protuberance 16 which need only have a maximum height of about 2.5 mm, causes the magnetic field presented by the magnetic means 20 at the surface of the protuberance to be reduced from that present at the other portions of the outer surface of member 14 so that the magnetic field presented by the magnetic means 38 is sufficient to cause toner powder brought to the protuberance 16 to be magnetically transferred to the surface of the rotating cylindrical member 32 which carries the toner powder back to the toner powder reservoir 10.

Figure 2:
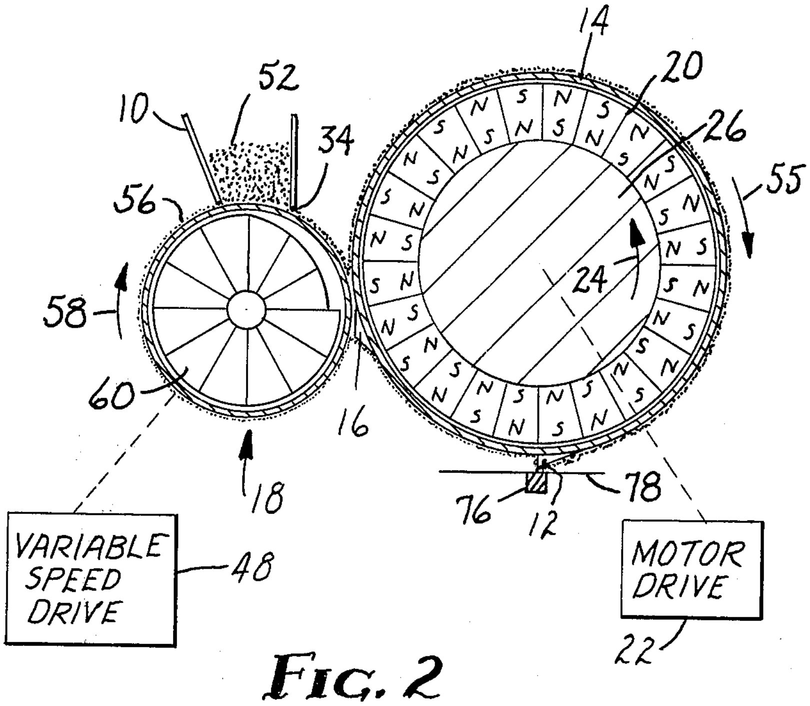
FIG. 2 is a schematic cross-sectional view of a second embodiment of the invention.

Referring to FIG. 2, another embodiment of the invention providing a toner powder transport system is shown. The reference numerals used in FIG. 1 are used in FIG. 2 to designate like or similar corresponding parts and assemblies. As for FIG. 1, the system of FIG. 2 includes a nonrotatable cylindrical member 14 having a protuberance 16 at its surface with a rotatable magnetic means 20 disposed for rotation about its axis in one direction within the nonrotatable cylindrical member 14. Except for a slight difference in the profile presented for the protuberance 16, the structure just described for FIG. 2 is the same as that described in detail in connection with FIG. 1. As for FIG. 1, motor drive 22 is used to drive the rotatable magnetic means 20 in one direction as indicated by the arrow at 24, which shows counterclockwise rotation.

A magnetic transport means 18 is provided which requires fewer parts than the magnetic transport means 18 provided in the system of FIG. 1 and includes a rotatable cylindrical member 56 disposed for rotation about its axis in a direction opposite to the direction of rotation of the rotatable magnetic means 20 within the nonrotatable cylindrical member 14. Clockwise rotation of the member 56 is provided as indicated by arrow 58. The system of FIG. 2 has a toner reservoir 10 which presents an opening at 34 adjacent to the outer surface of cylindrical member 56. An adjustable doctor blade (not shown) is used at the opening 34 for adjustment of the flow of toner powder from the reservoir. The cylindrical member 56 is also disposed so that its outer surface moves past one point close to the protuberance 16 and also moves past and close to a portion of the outer surface of the nonrotatable cylindrical member 14 that is spaced from the protuberance 16. A magnetic means 60 similar to the magnetic means 38 and 46 of FIG. 2 is mounted within the rotatable cylindrical member 56. The magnetic means 60 differs from the magnetic means structure 38 and 46 of FIG. 1 with respect to the portion of the magnets that are cut away. The magnetic means 60 is positioned and the degree to which the magnets have a portion cut away is such that the magnetic field is increasingly reduced in strength at the surface of member 56 starting at a point near the opening 34 provided at the toner reservoir 10 to the point where the rotatable cylindrical member 56 is close to the nonrotatable cylindrical member 14. The rotatable cylindrical member 56 is operatively connected to a variable speed drive 48 to rotate the member 56 clockwise at a slow speed relative to the speed of rotation of the magnetic means 20. As for cylindrical members 32 and 44 of FIG. 1, the cylindrical member 56 is rotated at a rate of about 1 to 10 rpm. The magnetic means 20 is rotated by motor drive 22 at a rate on the order of 3600 rpm.

When magnetically attractable toner powder 52 is present in the toner reservoir 10, clockwise rotation of the cylindrical member 56 causes toner powder to be carried from the reservoir via the opening 34 to the area of the member 56 close to the nonrotating cylindrical member 14. At this point the magnetic field provided by the magnetic means 20 is great enough to cause the toner powder to be magnetically transferred from the cylindrical member 56 to the cylindrical member 14. As has been indicated, the magnetic means 20 is rotated very rapidly in a counterclockwise direction. This causes the toner powder particles to tumble and move in a clockwise direction over the surface of the cylindrical member 14 as indicated by arrow 55. The toner powder is carried over the styli array 12 to the protuberance 16 at the surface of the cylindrical member 14. Since protuberance 16 reduces the strength of the magnetic field from the magnetic means 20 acting on the toner powder at the protuberance 16, the magnetic field presented by the magnetic means 60 is sufficient to cause the toner powder brought to the protuberance 16 to be magnetically transferred to the surface of the rotating cylindrical member 56 which then carries the toner powder back to the toner powder reservoir 10.

Figure 3:
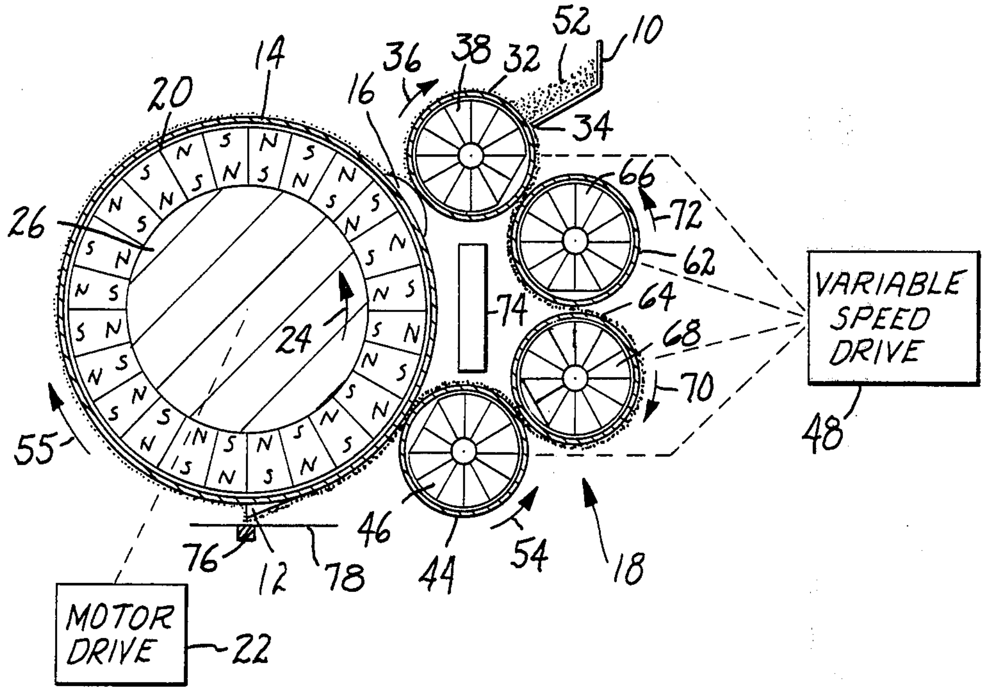
FIG. 3 is a schematic cross-sectional view of a third embodiment of the invention.

Referring to FIG. 3, another toner powder transport system is shown embodying the invention. The reference numerals used in FIG. 1 are used in FIG. 3 to designate like or similar corresponding parts and assemblies. The embodiment shown in FIG. 3 differs from that shown in FIG. 1 in that the two rotatable cylindrical members 32 and 44 are spaced apart by a transport coupling means that takes toner powder carried on the rotatable cylindrical member 32 from the toner reservoir 10 and transfers it to the rotatable cylindrical member 44. The transport coupling means includes a first moveable surface portion disposed for movement close to the rotatable cylindrical member 32 and a second moveable surface portion disposed for movement close to the rotatable cylindrical member 44. The transport coupling means also provides a magnetic field at the first moveable surface portion which is of a strength sufficient to transfer toner powder carried on the rotatable cylindrical member 32 to the transport coupling means. The magnetic field provided by the magnetic means 46 within the rotatable cylindrical member 44 presents a magnetic field at a second moveable portion of the transport coupling means that is of a strength sufficient to transfer toner powder carried on the transport coupling means to the rotatable cylindrical member 44.

Referring to FIG. 3, the transport coupling means includes two rotatable cylindrical members 62 and 64 plus a magnetic means 66 positioned within the member 62 and a magnetic means 68 positioned within the cylindrical member 64. The member 62 is positioned close to members 32 and 64 and member 64 is positioned close to member 44. Referring to the rotatable cylindrical member 32 and magnetic means 38 in assembly in FIG. 3, the portion of the magnetic means 38 that is cut away, so a lesser magnetic field is presented at the surface of the cylindrical member 32 opposite such portion, is positioned so that the portion providing the reduced magnetic field is provided opposite the rotatable cylindrical member 62. The magnetic means 66 and 68 are similar in structure to the magnetic means 38 and 46. Accordingly, each of the magnetic means 66 and 68 has a portion cut away so a lesser magnetic field is presented at a portion of the surface of the cylindrical members 62 and 64, respectively. The magnetic means 66 is positioned so that the portion providing the reduced magnetic field is opposite the cylindrical member 64. The magnetic means 68 is positioned so that the portion that is cut away to provide a lesser magnetic field at the surface of the cylindrical member 64 is opposite the cylindrical member 44. The magnetic means 46 is positioned as in FIG. 1 so that its portion that presents a lesser magnetic field at the surface of cylindrical member 44 is opposite the nonrotatable cylindrical member 14. Each of the rotatable cylindrical members 32, 44, 62 and 64 are operatively connected to a variable speed drive 48 for rotation at the same time. The drive 48 rotates the cylindrical members 32 and 64 in a clockwise direction as indicated by arrows 36 and 70 respectively, and rotates cylindrical members 44 and 62 in a counterclockwise direction as indicated by arrows 54 and 72, respectively. The cylindrical members 32, 44, 62 and 64 are rotated at a slow speed relative to the speed of rotation to the magnetic means 20. The cylindrical members 32, 44, 62 and 64 are rotated at a rate of about 1 to 10 rpm, while the magnetic means 20 is rotated at a rate on the order of 3600 rpm.

As in FIG. 1, a toner reservoir 10 is provided which presents an opening at 34 adjacent to the outer surface of cylindrical member 32. As for FIGS. 1 and 2, an adjustable doctor blade (not shown) is used at the opening 34 to adjust the flow of toner from the reservoir. When magnetically attractable toner powder 52 is present in the toner powder reservoir 10, clockwise rotation of the cylindrical member 32 causes toner powder to be carried from the toner powder reservoir via the opening 34 to the area of the cylindrical member 62 that is close to the cylindrical member 32. At this point the magnetic field provided by the magnetic means 66 is great enough to cause the toner powder to be magnetically transferred from the cylindrical member 32 to the cylindrical member 62. Rotation of the cylindrical member 62 in a counterclockwise direction carries the toner powder that is transferred to the cylindrical member 62 to the portion of the cylindrical member 64 positioned close to the cylindrical member 62. At this point the magnetic field provided by the magnetic means 68 is great enough to cause the toner powder to be magnetically transferred from the cylindrical member 62 to the cylindrical member 64. Clockwise rotation of the cylindrical member 64 serves to carry the toner powder that is transferred to cylindrical member 64 to the area of cylindrical member 44 that is close to the cylindrical member 64. At this point the magnetic field provided by the magnetic means 46 is great enough to cause the toner powder to be magnetically transferred from the cylindrical member 64 to the cylindrical member 44. Counterclockwise rotation of the cylindrical member 44 then carries the toner powder that is magnetically transferred to cylindrical member 44 to the area of the nonrotating cylindrical member 14 that is close to the cylindrical member 44. At this point the magnetic field provided by the magnetic means 20 is great enough to cause the toner powder to be magnetically transferred from the cylindrical member 44 to the cylindrical member 14. As in the systems of FIGS. 1 and 2, the magnetic means 20 is rotated very rapidly in a counterclockwise direction which causes the toner powder particles to tumble and move in a clockwise direction over the surface of the cylindrical member 14 as indicated by arrow 55. Such movement carries the toner powder over the styli array 12 to the protuberance 16 at the surface of the cylindrical member 14. Since the protuberance 16 reduces the strength of the magnetic field from the magnetic means 20 acting on the toner powder at the protuberance 16, the magnetic field presented by the magnetic means 38 is sufficient to cause the toner powder brought to the protuberance 16 to be magnetically transferred to the surface of the rotating cylindrical member 32. The rotation of member 32 serves to carry the toner powder back to the toner powder reservoir 10.

As can be seen in FIG. 3, the outer diameter of cylindrical member 62 plus the outer diameter of cylindrical member 64 is greater than the space between cylindrical members 32 and 44 so that the spacing of cylindrical members 62 and 64 close to cylindrical members 32 and 44, respectively, causes a space to be defined by the cylindrical member 14 and cylindrical members 32, 44, 62 and 64 which can be utilized for receiving drive circuitry required for the styli array 12. The rectangle 74 is used to schematically indicate the utilization of the space for such purpose.

The toner transport systems of FIGS. 1–3 are useful for presenting toner to the styli array 12 when it is positioned a short distance from an electrode 76 schematically indicated in each of FIGS. 1–3 with a dielectric receptor member arranged for movement through the space between the styli array 12 and the electrode 76 while direct electrical contact is maintained between the electrode 76 and the receptor member. The styli array 12 is not shown in detail. The array, for example, can include a large number of stylus electrodes which are electrically spaced apart. The array extends axially of the cylindrical member 14. Construction of a suitable styli array is well-known in the prior art. Using magnetically attractable toner powder which is also conductive, electrical signals selectively applied between the various styli and the electrode 76 will cause toner to be deposited on the dielectric receptor 78 in accordance with the electrical signals. Such a printing process is known in the prior art. Reference can be made to U.S. Pat. No. 3,816,840 to Arthur R. Kotz should details be sought regarding the process.

The size of the opening 34 at the toner reservoir 10 is one factor that determines the amount of toner that is carried on the rotatable cylindrical member 32. As has been indicated, the size of the opening 34 is controlled by an adjustable doctor blade positioned at the opening 34. Another factor determining the amount of toner that is brought to the nonrotatable cylindrical member 14 is the speed of the various rotatable cylindrical members which are used to provide the magnetic transpot means for moving toner from the toner reservoir 10 to the cylindrical member 14.

The toner transport systems shown in FIGS. 1–3 provide excellent control for providing a uniform supply of magnetically attractable toner powder to the styli array 12 plus effective control over the amount of toner that is so supplied together with a means for effectively removing toner from the styli array that is not deposited on a dielectric receptor 78 and returning it to the toner reservoir 10. The toner powder is constantly under the influence of various magnetic fields that are provided which contribute to the effectiveness of the systems. Since the image receptor member is not used in any way to carry toner to the recording area at the stylus array, backgrounding is virtually eliminated.

What is claimed is:

1. A toner powder transport system for providing controlled movement of magnetically attractable toner powder over an imaging styli array including:

a nonrotatable cylindrical member of nonmagnetic material having a protuberance at its surface;

a rotatable magnetic means disposed for rotation about its axis in one direction within said nonrotatable cylindrical member, said rotatable magnetic means presenting alternate magnetic poles adjacent the inner surface of said nonrotatable cylindrical member;

an imaging styli array positioned at the surface of said nonrotatable cylindrical member;

a toner reservoir for holding a supply of magnetically attractable toner powder, said toner reservoir having an opening through which toner can be removed from said toner reservoir;

a magnetic transport means disposed between said toner reservoir and said nonrotatable cylindrical member, said magnetic transport means having a first portion presented near said protuberance and a second portion presented near said nonrotatable cylindrical member, at an area removed from said protuberance, said magnetic transport means presenting a magnetic field at said protuberance that is of a strength sufficient to move toner presented at said protuberance to said magnetic transport means, said rotatable magnetic means presenting a magnetic field at said second portion that is of a strength sufficient to move toner powder from said magnetic transport means to said nonrotatable cylindrical member, said magnetic transport means including a surface disposed for movement adjacent said opening in said toner reservoir whereby toner powder, when present in said toner reservoir, is magnetically transferred from said toner reservoir and carried to said second portion for magnetic transfer to said nonrotatable cylindrical member where rotation of said rotatable magnetic means causes said toner powder that is transferred to said nonrotatable cylindrical member to be magnetically transported over the surface of said nonrotatable cylindrical member to said imaging styli array and thence to said protuberance, where toner powder reaching said protuberance is magnetically transferred to said magnetic transport means from said nonrotatable cylindrical member at said first portion of said magnetic transfer means and returned by said magnetic transport means to said toner reservoir.

2. A toner powder transport system according to claim 1 wherein said magnetic transport means includes:

a rotatable cylindrical member disposed for rotation about its axis in a direction opposite to the direction of rotation of said rotatable magnetic means, the outer surface of said rotatable cylindrical member providing said surface disposed for movement adjacent said opening of said toner reservoir; and a magnetic means mounted within said cylindrical member for presenting said magnetic field of said magnetic transport means.

3. A toner powder transport system according to claim 1 wherein said magnetic transport means includes:

a first rotatable cylindrical member disposed for rotation about its axis in a direction opposite to the direction of the rotation of said rotatable magnetic means, the outer surface of said first rotatable cylindrical member providing said surface disposed for movement adjacent said opening of said toner reservoir and providing said first portion of said magnetic transport means positioned near said protuberance;

a second rotatable cylindrical member positioned adjacent said first rotatable cylindrical member and disposed for rotation about its axis in the direction opposite the direction of rotation of said first rotatable cylindrical member, the outer surface of said second rotatable cylindrical member providing said second portion of said magnetic transport means;

a first magnetic means mounted within said first rotatable cylindrical member providing said magnetic field of said magnetic transport means at said protuberance;

a second magnetic means mounted within said second rotatable cylindrical member providing a magnetic field adjacent said first rotatable cylindrical member that is of a strength sufficient to move toner powder from said first rotatable cylindrical member to said second rotatable cylindrical member.

4. The toner powder transport system according to claim 1 wherein said magnetic transport means includes:

a first rotatable cylindrical member disposed for rotation about its axis in a direction opposite to the direction of rotation of said rotatable magnetic means, the outer surface of said first rotatable cylindrical member providing said surface disposed for movement adjacent said opening of said toner reservoir and providing said first portion of said magnetic transport means positioned near said protuberance;

a first magnetic means mounted within said first rotatable cylindrical member presenting said magnetic field of said magnetic transport means at said protuberance;

a second rotatable cylindrical member disposed for rotation about its axis, the outer surface of said second rotatable cylindrical member providing said second portion of said magnetic transport means;

a second magnetic means mounted within said second rotatable cylindrical member providing a magnetic field at a portion of said second rotatable cylindrical member;

transport coupling means having a first moveable surface portion disposed for movement adjacent said first rotatable cylindrical member and a second moveable surface portion disposed for movement adjacent said second rotatable cylindrical member, said transport coupling means providing a magnetic field at said first moveable surface portion of a strength sufficient to move toner powder from said first rotatable cylindrical member to said transport coupling means and said magnetic field provided by said second rotatable cylindrical member being of a strength sufficient to move from toner powder from said second moveable surface portion of said transport coupling means to said second rotatable cylindrical member.

* * * * *

UNITED STATES PATENT AND TRADEMARK OFFICE
CERTIFICATE OF CORRECTION

PATENT NO. : 4,418,357

DATED : November 29, 1983

INVENTOR(S) : Charles P. Huss

It is certified that error appears in the above—identified patent and that said Letters Patent is hereby corrected as shown below:

Column 10, line 5, "transpot" should read -- transport --.

Column 11, line 12 (claim 2), after "said" insert -- rotatable --.

Signed and Sealed this

*Seventeenth* Day of *April 1984*

[SEAL]

*Attest:*

GERALD J. MOSSINGHOFF

*Attesting Officer* *Commissioner of Patents and Trademarks*